United States Patent [19]

Bury

[11] 4,406,438

[45] Sep. 27, 1983

[54] CABLE ROUTINE CLIP

[75] Inventor: George J. Bury, Lake Villa, Ill.

[73] Assignee: Illinois Tool Works Inc., Chicago, Ill.

[21] Appl. No.: 327,847

[22] Filed: Dec. 7, 1981

[51] Int. Cl.³ .......................................... F16M 13/00
[52] U.S. Cl. ................................................. 248/544
[58] Field of Search ........................... 248/544, 71, 73

[56] References Cited

U.S. PATENT DOCUMENTS 3,848,080 11/1974 Schmidt .............................. 248/71
4,094,483 6/1978 Busch .................................. 248/73
4,295,618 10/1981 Morota ................................ 248/73

Primary Examiner—William H. Schultz
Assistant Examiner—Ramon O. Ramirez
Attorney, Agent, or Firm—Jack R. Halvorsen; Thomas W. Buckman

[57] ABSTRACT

The cable routing device as disclosed is integrally formed and includes at least one base and at least one cable guiding portion. The base includes a tongue extending from one end and a tool engageable portion at the other end. The tongue preferably has an enlarged end which is adapted to be driven behind the bottom edge of a piece of siding by a tool being struck against the tool engaging portion to thereby securely position the cable routing device in close proximity to the bottom edge of the piece of siding. Each device has a cable guiding portion which is generally U-shaped and which tapers in depth from the upper end towards the other end. The cable guiding portion is adapted to guide a cable in one of two substantially perpendicular positions by either positioning the cable proximate the bight of the U-shaped portion or by its engagement in notches in the upper edges of the sidewalls of the U-shaped guide portion.

13 Claims, 9 Drawing Figures

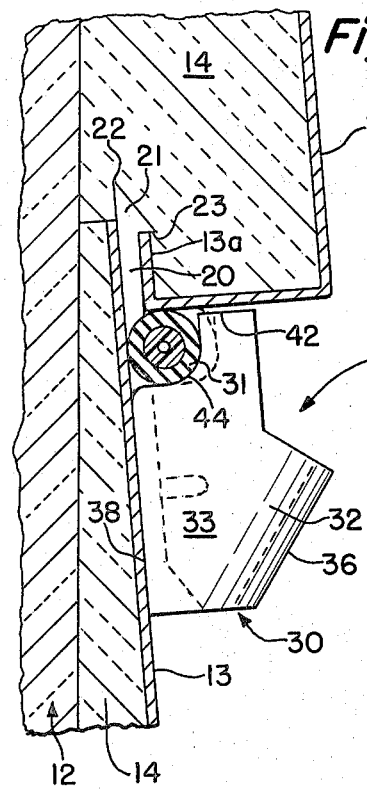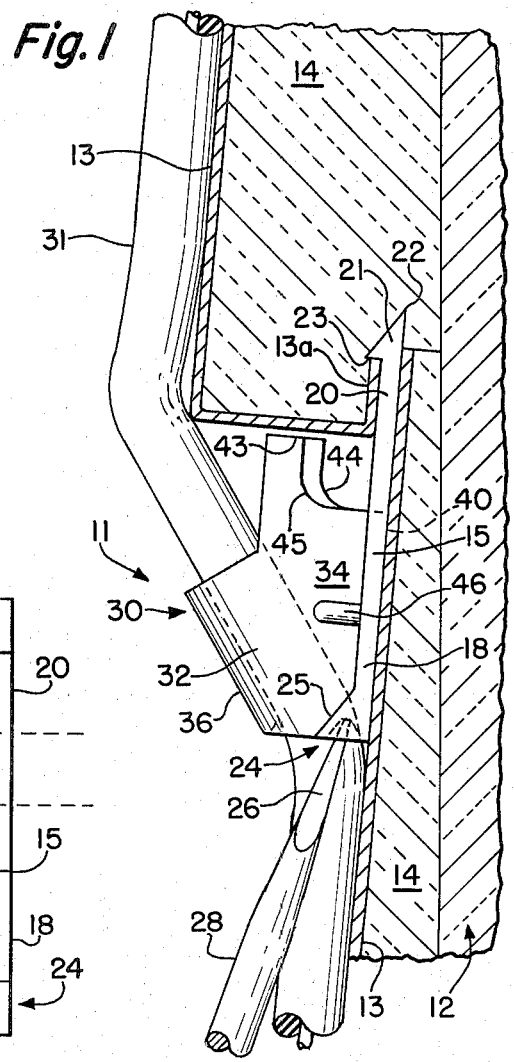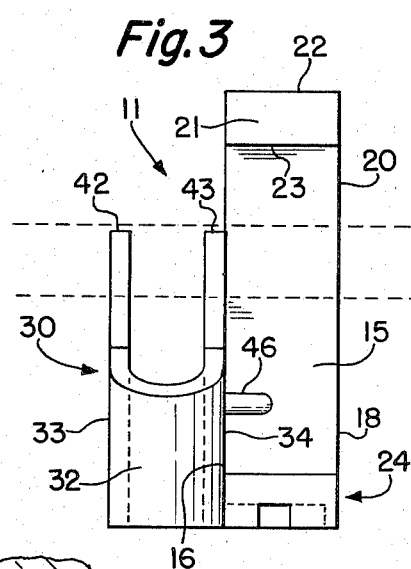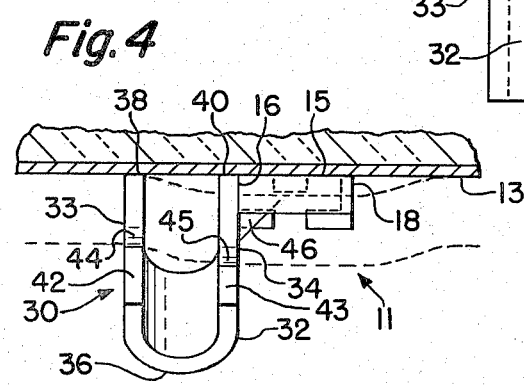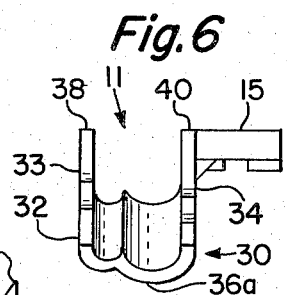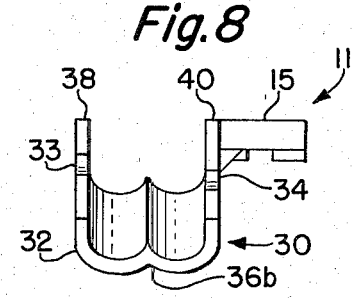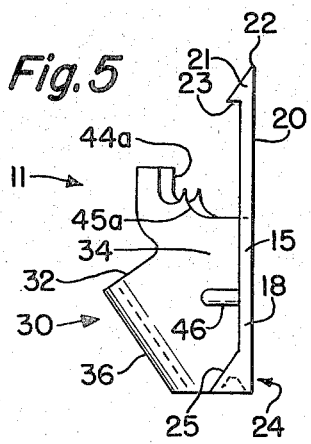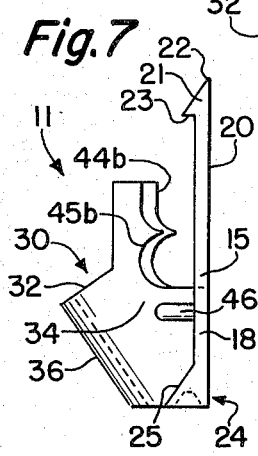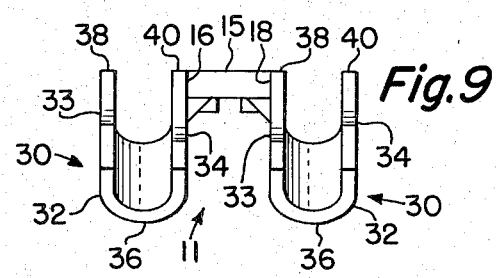

CABLE ROUTINE CLIP

BACKGROUND OF THE INVENTION

This invention relates to a device which is easily attached to the siding on the exterior of a building and which is capable of supporting television type cable either parallel or substantially perpendicular to the bottom edge of the siding.

The prior art is replete with many forms of cable guides embodying many variations in component shape and size. One common form of the device is to provide different clips for routing in different directions wherein each clip is of one-piece construction and includes a tongue and a U-shaped guide, e.g. vertical siding clip, part no. 062-0200, and horizontal siding clip part no. 062-0100, made by Dek, Inc. To route cable in two different directions relative to the siding on a building with these devices requires separate clips, each of which is particularly adapted for single directional routing. Another prior art device is capable of two directional routing (see U.S. Pat. No. D. 239,593) by utilizing a pair of extending arms for routing a cable parallel to the siding and a T-shaped element for guiding a cable perpendicular to the siding. None of the prior art devices have the advantages of the device of this invention. The advantages of applicant's device will become more apparent from the following disclosure.

SUMMARY OF THE INVENTION

Ideally a routing device of the type contemplated here would be of a low cost, capable of being fabricated by mass production techniques, reliable while securely retaining cable, easily installed, and attractive while presenting a low profile relative to the siding on a building.

To approach this ideal, the present invention utilizes a unitary construction with a base integrally formed with a cable guiding portion. The cable guiding portion is generally U-shaped and tapers from its upper end downwardly to a point where the cable may be closely surrounded by the U-shaped guide. The upper end of the U-shaped guide is substantially deeper to provide for transitioning of the cable when it is being routed substantially perpendicular to the bottom edge of a piece of siding from the face of the piece of siding behind which the device is forced to the face of the next lower piece of siding. The object of the transitioning being to route the cable down and in close proximity to the face of the siding without the necessity of any sharp bends in the cable. The U-shaped cable guiding portion includes cable sized notches at the upper ends of each of the sidewalls which cooperate with the bottom edge of the piece of siding behind which the device is formed to maintain a cable being routed substantially parallel to the bottom edge of the piece of siding.

The design of the instant invention brings to the marketplace a routing clip for routing television type cable in close proximity to the siding on the exterior of a building. The device has the versatility of routing the cable either parallel or substantially perpendicular to the bottom edge of a piece of siding and yet provides a low profile which will at times be completely in the shadow line of a piece of siding.

It is therefore an object of this invention to provide a new and improved one-piece cable guide.

It is a further object of my invention to provide a new and improved one-piece cable guide with integrally formed base and cable guide wherein the cable guide is of a novel configuration.

It is still a further object of my invention to provide a new and improved cable guide with the capability to route cable in at least two different directions while providing a low profile relative to the siding to which it is attached.

Other objects, features and advantages of the invention will become more apparent from the following specification and claims taken in conjunction with the drawings.

BRIEF DESCRIPTION OF THE DRAWINGS

Referring now to the drawings:

FIG. 1 is a side elevational view showing one embodiment of the clip of the instant invention positioning a cable substantially perpendicular to the bottom edge of a piece of siding;

FIG. 2 is a side elevational view of the clip of FIG. 1 showing a cable positioned substantially parallel to the bottom edge of a piece of siding;

FIG. 3 is a front elevation view of the clip shown in FIG. 1;

FIG. 4 is a top plan view of the clip of FIG. 1;

FIG. 5 is a side elevational view of a clip, according to the invention, showing another embodiment of cable guide means which is adapted to position the cable substantially parallel to the bottom edge of a piece of siding;

FIG. 6 is a top plan view of a clip, according to the invention, showing another embodiment of the U-shaped cable guide which is adapted to position a cable substantially perpendicular to the bottom edge of a piece of siding;

FIG. 7 is a side elevational view of a clip, according to the invention, showing a further embodiment of the cable guide means which is adapted to position the cable substantially parallel to the bottom edge of a piece of siding;

FIG. 8 is a top plan view of a clip, according to the invention, showing a further embodiment of U-shaped cable guide which is adapted to position a siamese cable or a pair of cables substantially perpendicular to the bottom edge of a piece of siding; and FIG. 9 is a top plan view of another embodiment of the clip, according to the invention, showing a clip having a pair of U-shaped cable guides.

DETAILED DESCRIPTION OF THE PREFERRED EMBODIMENT

Referring in detail to the drawing, there is seen in FIGS. 1-4 a cable positioning device 11 attached to the wall of a building 12. Wall 12 has a protective covering of siding 13 thereon which may take many different forms, e.g. cedar lapped siding, aluminum or vinyl siding, asbestos shingle siding, etc. The type of siding depicted is a thin wall type of either aluminum or vinyl which preferably has an insulative stiffener 14 for backing.

The cable positioning device 11 has a base 15 with marginal side edges 16 and 18. The base 15 has a tongue 20 extending from one end thereof. The tongue 20 preferably includes at least one enlarged area 21 which will increase the frictional engagement of the tongue 20 with a piece of siding when it is forced therebehind. Ideally the enlarged area 21 is adjacent the end of the tongue 20 and has a detent or hook 23 which will resist dislodgement of the device 11 from the siding 13 by catching an upturned inner edge 13a of the piece of siding 13 in a hook-like manner. Tongue 20 includes a pointed end 22 to facilitate entry of the end of the tongue 20 behind the piece of siding 13. The opposite end of the base from said tongue 20 has means 24 which is adapted to receive the end of a tool, e.g. the blade 26 of a screwdriver 28. The means may be substantially V-shaped as at 25 with notches in the sidewalls of the V-shape.

The positioning device 11 as seen in FIGS. 1-4 includes a substantially U-shaped member 30 which is designed to have the capability of positioning a cable 31 in one of two substantially perpendicular positions. The cable 31 may be of a coaxial-type which is popular in the cable television industry. The U-shaped guide 30 includes a U-shaped portion 32 having a pair of sidewalls 33, 34 and a bight portion 36. Each of the sidewalls 33, 34 have distal edges 38, 40, respectively, and edges which are integrally formed with the bight portion 36. Each sidewall 33, 34 has an end edge 42, 43 respectively, and each sidewall 33, 34 tapers from its respective end edge towards its other end thereby forming with said bight portion 36 a U-shaped portion 32 which reduces in depth from one end to the other. The end of each sidewall 33, 34 opposite each of the end edges 42, 43 forms with the bight portion 36 and the face of a piece of siding, against which the device 11 is juxtaposed, an opening which approximates the size of the cable which is being positioned thereby. Each end edge 42, 43 has a cable receiving notch 44, 45, respectively, formed therein which is adapted to receive and position a cable substantially perpendicular to a cable which is received and positioned juxtaposed the bight portion 36 of the U-shaped portion. The U-shaped member 30 is integrally formed with the base 15 by one of the distal edges 38, 40 adjoined to one of the marginal edges 16, 18 of the base 15. Preferably the U-shaped member 30 is offset to one side of the base 15 wherein only one of the distal edges 38, 40 is attached to the base 15 to thereby provide ease of engagement of the device 11 with a cable 31 by simply slipping the U-shaped portion 32 over the cable 31. Clearly, the U-shaped member 30 could be superimposed on the base 15 with both of the distal edges 38, 40 attached to a respective marginal edge 16, 18 of the base 15 or the U-shaped member 30 could have a base 15 offset to each side giving the device 11 added strength in its attachment to the siding 13.

The cable positioning device 11 of FIGS. 5-8 show embodiments of the device which depict some of the adaptations that may be made for various cable configurations. Like numerals are used to indicate equivalent structure throughout the drawings. For example in FIG. 5 there is a doubled notch 44a, 45a in each of the end edges 42, 43 for substantially conforming to the cross-sectional configuration of a cable which has a messenger wire bonded thereto (not shown). In FIG. 6 the bight portion 36a of the U-shaped portion 32 is modified to substantially conform to a cable with messenger wire (not shown). FIGS. 7 and 8 show the notches 44b, 45b and bight 36b, respectively, of the U-shaped portion 32 being modified to accommodate either a pair of separate coaxial cables (not shown) or a siamese cable (not shown), i.e. a pair of coaxial cables bonded together so as to have a generally figure eight cross-sectional configuration. FIG. 9 shows a single base 15 being employed to support a pair of U-shaped members 30 wherein one U-shaped member 30 is attached to each marginal edge 16, 18, respectively, of the base 15 thereby permitting a pair of separate coaxial cables (not shown) to be positioned substantially parallel to the longitudinal axis (not depicted) of the base 15 but spaced from one another by a distance essentially the width of the base 15. It should be noted that any of the variations and permutations of single or plural bases along with variations in the notch and bight configurations, within the scope of this invention, are contemplated herein. Also note that the device 11 may be reinforced as needed, and an example of a reinforcing rib 46 is shown. In use, it is preferred that the device 11 have the cable 31 oriented relative thereto prior to the device 11 being secured to the wall 12. However, once the device 11 is secured to the wall it is contemplated that the cable 31 could then be threaded therethrough. Ideally, the device either is positioned over the cable 31 with the cable 31 lying against the inside of the bight portion 36 or with the cable 31 fitting snuggly within the notches 44, 45. The device 11 may then be juxtaposed the face of one piece of siding 13 with the pointed end 22 of the tongue 20 proximate the juncture of that piece of siding and the piece of siding next thereabove. When in this position, a tool, e.g. the blade 26 of a screwdriver 28, may be engaged in the tool receiving means 24 and driven thereagainst to force the tongue 20 of the device 11 behind the bottom upturned edge 13a of the next higher piece of siding 13. Where the device 11 is used with aluminum or vinyl type siding the detent 23 on the end of the tongue 20 will engage the inwardly and upwardly bent edge 13a of the siding 13 to be positively positioned relative thereto. Preferably the detent 23 is spaced from the end edges 42, 43 a predetermined distance which is substantially equal to the length of the upturned inner edge of the piece of siding to thereby position the end edges proximate the bottom of the piece of siding when the detent engages the upturned edge. It can be seen that the notches 44, 45 cooperate with the bottom of the piece of siding to surround the cable and prevent its disengagement from the device.

The advantages of the device 11 should be readily apparent and include the fact that the device 11 can be mass produced economically of relatively inexpensive plastic materials, that the device is simple to use, and that the device is easily reuseable. Another advantage is that when the device is used to position cable substantially parallel to the bottom edge of a piece of siding, the device and the cable will be substantially contained within the shadowline of the siding. When the device is used to position a cable substantially perpendicular to the bottom edge of a piece of siding the cable is advantageously positioned and secured close to the faces of the siding by the transitioning ability of the U-shaped portion. The primary advantage is clearly the versatility of the device and the manner in which it cooperates with the siding to secure a cable thereto.

Obvious modifications in form or structure may be made without departing from the spirit or scope of the invention.

I claim:

1. A cable mounting device, particularly adapted to position television type cable in close proximity to the siding on a building, comprising at least one base member, said base member having a longitudinal axis and a pair of side margins, tongue means extending in the direction of the longitudinal axis from one end of the said base and being adapted to be driven behind a piece of siding to secure the device to the building, means at the other end of said base adapted to be engaged and driven by a tool in the direction of the extension of said tongue, a substantially U-shaped guide having a longitudinal axis, a pair of sidewalls, and a bight portion, said longitudinal axis of said U-shaped guide being generally parallel to said sidewalls, each of said sidewalls having at least a distal edge, an edge integrally formed with said bight portion, and an end edge, each of said sidewalls generally reducing in height from each respective end edge thereby forming with said bight portion a U-shaped guide which reduces in depth from said end edges, a distal edge of one of said sidewalls attached to one of said side margins of said base with the end edge of said one of said sidewalls proximate said one end of said base to thereby orient said longitudinal axis of said U-shaped guide relative to the longitudinal axis of said base, guide means associated with each said end edge for positioning and retaining a cable transverse to the longitudinal axis of said base, whereby a cable to be positioned and retained in one of two substantially perpendicular positions relative to the building is first engaged in either the guide means or the U-shaped guide of the device and then device is attached to the building by driving the tongue means behind a piece of siding by a tool engaging said means at the other end of said base.

2. The cable mounting device according to claim 1 wherein said tongue means includes a pointed end at the distal end thereof to facilitate entry behind said piece of siding.

3. The cable mounting device according to claim 2 wherein said tongue means includes at least one resilient detent thereon which when driven behind the piece of siding aids in resisting removal of said device.

4. The cable mounting device according to claim 3 wherein said resilient detent on said tongue means is spaced from said end edges a predetermined distance so that when said detent engages an upturned inner edge of a piece of siding the end edges will be proximate the bottom of the piece of siding.

5. The cable mounting device according to claim 1, wherein the distal edge of the other sidewall of said U-shaped guide is attached to the other marginal edge of said base.

6. The cable mounting device according to claim 1 wherein said guide means includes a relieved area in the end edge of each said sidewall of said U-shaped guide, each said relieved area adapted to confrom to the general cross sectional configuration of said television cable.

7. The cable mounting device according to claim 6 wherein there are a pair of relieved areas in each end edge of each said sidewall of said U-shaped guide, said pairs of relieved areas being adapted to conform to the cross sectional configuration of a pair of coaxial-type television cables or a single siamese type television cable.

8. The cable mounting device according to claim 1 wherein there is second substantially U-shaped guide having a longitudinal axis including a pair of sidewalls and a bight portion, each of said sidewalls having at least a distal edge, an edge integrally formed with said bight portion, and an end edge, each of said sidewalls generally reducing in height from each respective end edge thereby forming with said bight portion a U-shaped guide which reduces in depth from said end edges, wherein a distal edge of one of said sidewalls is attached to the other of said side margins of said base with the end edge of said one of said sidewalls proximate said one end of said base to thereby orient said longitudinal axis of said second U-shaped guide relative to the longitudinal axis of said base, wherein the first said U-shaped guide and said second U-shaped guide are positioned on opposite sides of said base member utilizing opposite side margins of said base member for attachment thereto.

9. The cable mounting device according to claim 1 wherein there is a second substantially U-shaped guide having a longitudinal axis including a pair of sidewalls and a bight portion, each of said sidewalls having at least a distal edge, an edge integrally formed with said bight portion, and an end edge, each of said sidewalls generally reducing in height from each respective end edge thereby forming with said bight portion a U-shaped guide which reduces in depth from said end edges, wherein a distal edge of one of said sidewalls of said second U-shaped guide is attached to a distal edge of the other of said sidewalls of the first said U-shaped guide to thereby orient the longitudinal axis of said second U-shaped guide relative to the longitudinal axis of said base member whereby a pair of cables may be guided in a side by side manner.

10. The cable mounting device according to either claim 8 or claim 9 wherein each of said end edges of said sidewalls of said second U-shaped guide include guide means for guiding a cable engaged therein substantially perpendicular to the longitudinal axis of said base member.

11. The cable mounting device according to claim 1 wherein said device has a low profile and when cable is being routed substantially parallel to the bottom edge of a piece of siding the device will utilize the shadow lines created by the siding.

12. The cable mounting device according to claim 7 wherein said relieved areas are oriented with their centers in a plane parallel to the longitudinal axis of said base member, whereby a pair of cables or a siamese-type cable would be oriented with their centers in a plane parallel to the longitudinal axis of said base member.

13. The cable mounting device according to claim 7 wherein said relieved areas are oriented with their centers in a plane perpendicular to the longitudinal axis of said base member.

* * * * *

UNITED STATES PATENT AND TRADEMARK OFFICE
CERTIFICATE OF CORRECTION

PATENT NO. : 4,406,438
DATED : September 27, 1983
INVENTOR(S) : George J. Bury

It is certified that error appears in the above-identified patent and that said Letters Patent is hereby corrected as shown below:

The title should read -- Cable Routing Clip --.

Signed and Sealed this

Twenty-third Day of October 1984

[SEAL]

Attest:

Attesting Officer

GERALD J. MOSSINGHOFF

Commissioner of Patents and Trademarks